United States Patent
O'Connor et al.

(10) Patent No.: US 8,229,842 B2
(45) Date of Patent: *Jul. 24, 2012

(54) SYSTEM AND METHOD FOR EVENT-BASED TRADING

(75) Inventors: Gerald J. O'Connor, Chicago, IL (US); Stephen J. Murphy, Oak Park, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/272,617

(22) Filed: Oct. 13, 2011

(65) Prior Publication Data

US 2012/0036060 A1    Feb. 9, 2012

Related U.S. Application Data

(63) Continuation of application No. 12/764,686, filed on Apr. 21, 2010, now Pat. No. 8,065,222, which is a continuation of application No. 10/734,862, filed on Dec. 12, 2003, now Pat. No. 7,734,528.

(51) Int. Cl.
*G06Q 40/00* (2012.01)
(52) U.S. Cl. ............................................. 705/37; 705/35
(58) Field of Classification Search .................... 705/37
See application file for complete search history.

(56) References Cited

U.S. PATENT DOCUMENTS

| | | | |
|---|---|---|---|
| 4,853,854 A | 8/1989 | Behar et al. | |
| 6,772,132 B1 | 8/2004 | Kemp, II et al. | |
| 7,127,424 B2 | 10/2006 | Kemp, II et al. | |
| 7,228,289 B2 | 6/2007 | Brumfield et al. | |
| 7,389,268 B1 | 6/2008 | Kemp, II et al. | |
| 7,640,206 B1 | 12/2009 | O'Connor et al. | |
| 7,734,528 B1 | 6/2010 | O'Connor et al. | |
| 2002/0147670 A1* | 10/2002 | Lange | 705/35 |
| 2003/0012069 A1 | 1/2003 | Park et al. | |
| 2006/0069635 A1* | 3/2006 | Ram et al. | 705/37 |
| 2010/0198749 A1 | 8/2010 | O'Connor et al. | |

* cited by examiner

*Primary Examiner* — James Vezeris
(74) *Attorney, Agent, or Firm* — McDonnell Boehnen Hulbert & Berghoff LLP

(57) ABSTRACT

A system and method for news-based trading are developed. According to one method, a trader can pre-define a trading strategy including a number of trading rules to be applied based on a comparison of one or more estimated event values to the respective actual event values to be released at some later time. The example method further includes, upon receiving one or more actual event values via a user input or directly from outside sources, executing one or more predefined trading rules selected based on the comparison of the received actual event values to the respective estimated indicator values.

17 Claims, 8 Drawing Sheets

News Watch 700

| | Time Until 704 | Number 706 | 1min 23sec 702 | | 712 | |
|---|---|---|---|---|---|---|
| | | | EDec03 708 | NQ Dec03 710 | | |
| 2.0 | | | S 75 | S 50 | | |
| 1.75 | | H | S 50 | S 25 | | |
| 1.5 | | | S 25 | S 5 | | |
| 1.25 | | E | - | D.A. | 1.75 | Prev |
| 1.0 | | | - | B 5 | | |
| 0.75 | | | B 10 | B 10 | | |
| 0.5 | | | B 15 | B 15 | | |
| 0.25 | | L | B 20 | B 25 | | |
| 0.0 | | | B 50 | B 40 | | |

Activate 714           ☒           ☒
Use 716    Actual ☒    Revised ☐

FIG. 5

SYSTEM AND METHOD FOR EVENT-BASED TRADING

CROSS REFERENCE TO RELATED APPLICATIONS

The present application is a continuation of U.S. patent application Ser. No. 12/764,686, filed Apr. 21, 2010, now U.S. Pat. No. 8,065,222, which is a continuation U.S. patent application Ser. No. 10/734,862 filed on Dec. 12, 2003, now U.S. Pat. No. 7,734,528, the contents of which are incorporated by reference herein in their entirety.

FIELD OF INVENTION

The present invention is directed towards electronic trading. More specifically, the present invention is directed towards automatically executing predefined trading rules upon detecting announcements of economic indicators and/or other news related data associated with the trading strategies.

BACKGROUND

In recent years, a trend towards electronic trading has become well-established, causing one major exchange after another to replace or at least supplement the traditional open outcry, where a trade is done face to face, with automated, electronic systems which automatically match bids and offers. While the motivation behind using electronic trading may vary from market to market, greater efficiency and volume are some of the considerations.

In particular, subscribing traders are connected to an exchange's electronic trading platform by way of a communication link and through an application program interface to facilitate real-time electronic messaging between themselves and the exchange. The electronic messaging includes market information that is sent from the electronic market to the traders. Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all.

Additionally, the host exchange can offer other types of market information such as the last traded price ("LTP"), or the last traded quantity ("LTQ").

Just as with an open-outcry exchange, an electronic exchange can list any number of tradeable objects. Often times, traders will simultaneously trade more than one tradeable object, and they may simultaneously trade tradeable objects that are listed at more than one exchange. Ordinarily, each tradeable object has its own separate stream of market information. Therefore, in these instances, the traders will generally receive more than one stream of market information such that each stream of market information attempts to characterize a given tradeable object.

Once the traders receive market information, the market information may be displayed to them on their trading screens. Upon viewing the information, traders may take certain actions including the actions of sending buy or sell orders to the electronic market, adjusting existing orders, deleting orders, or otherwise managing orders. In general, traders may use trading screens to enter orders into the market, as well as to obtain and view market information. Traders may also use software tools on their client devices to automate these and additional actions.

Generally, when a trader submits an order to a host exchange, the host checks the conditions associated with the order, for example, price and quantity, and prioritizes the order with other orders at the same price. When the order conditions are satisfied, a trade occurs and trade information is then relayed in some fashion to one or more client devices so that the traders can have access to the most current market information.

To profit in today's rapidly moving markets, traders must be able to react more quickly and assimilate enormous amounts of data. For example, before making any trades, a trader may have to quickly assimilate and analyze many different types of data, such as market data, world news, or business news. Additionally, every week, different departments of the U.S. government, professional organizations, and academic institutions issue dozens of economic statistics and indicators. Such reports often serve as useful tools that allow one to assess the overall strength and the likely direction of the economy. These indicators can also have a significant impact on the markets, and can move the markets immensely on any given day. Therefore, many traders watch economic report announcements very closely, and many of them try to take advantage of the quick market changes that are caused by the announcements of some numbers, while others try to limit their losses to the possible minimum by attempting to delete any of their pending orders, for example.

Thus, it is desirable for electronic trading applications to offer tools that can assist traders in trading in an electronic trading environment, help them in making profitable trades in a speedy and accurate manner, while allowing the traders to effectively monitor and use the economic reports as well as other news announcements to their advantage.

BRIEF DESCRIPTION OF THE DRAWINGS

Example embodiments of the present invention are described herein with reference to the following drawings, in which:

FIG. 5 is a block diagram illustrating a graphical interface for receiving user inputs and/or displaying economic indicator values according to one example embodiment;

DETAILED DESCRIPTION

I. News Trader Overview

According to the preferred embodiments, a system and method are described herein for event-based trading. In the embodiments described hereinafter the events will be described in terms of any news-related indicators, such as unemployment number values, interest rates values, and others. According to one method, a trader can predefine a trading strategy including a number of trading rules to be applied based on a comparison of an estimated news-related indicator value to an actual news-related indicator value to be announced at some later time. Once the trader defines the trading rules, the method further includes receiving the actual news-related indicator value, and then responsively, selecting the appropriate trading rules, and automatically executing the selected trading rules. In one embodiment, the value of the actual indicator value can be received directly from a user who may input the value via a graphical interface. Alternatively, the actual indicator value can be received directly from outside news sources.

While the present invention is described herein with reference to illustrative embodiments for particular applications, it should be understood that the present invention is not limited thereto. Those having ordinary skill of art will recognize that many additional modifications and embodiments are possible as well.

II. Hardware- and Software Overview

Figure 1:
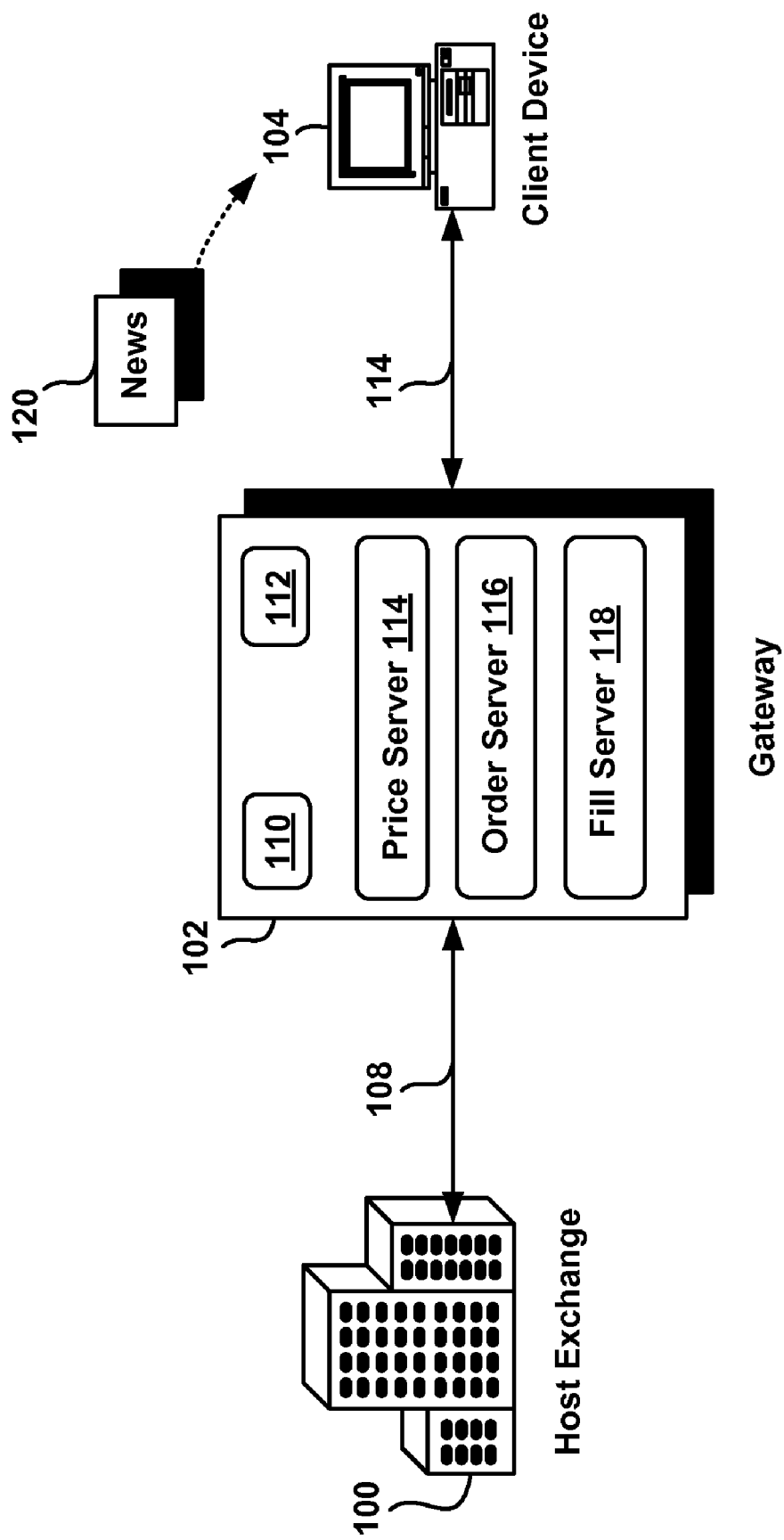
FIG. 1 is an example network configuration for a communication system utilized to access one or more exchanges.

FIG. 1 is a block diagram illustrating an example trading system in accordance with the preferred embodiments. The system includes a host exchange 100, a gateway 102, and a client device 104. Also, a trader at client device 104 might receive news from one or more news sources, such as a news source 120. FIG. 1 illustrates a single client device that is connected to a single exchange via a gateway; however, it should be understood that a plurality of client devices could connect to a plurality of exchanges via a plurality of gateways.

To receive news related data, a trader at the client device 104 may subscribe to one or more news services to receive news feeds from providers such as Bloomberg and Reuters, and/or the trader might subscribe to real-time quotation vendors that provide information to traders for decision support. However, it should be understood that traders could subscribe to other news and information sources, all of which are collectively referred to as news data. Also, it should be understood that the client device 104 may receive news data directly from the news sources, or via any intermediate devices, such as the gateway 102, for example.

Although each referenced component in FIG. 1 is described directly below in their respective sections, it should be understood that the components may take the form of an entirely hardware embodiment, an entirely software embodiment, or an embodiment combining software and hardware aspects. Furthermore, some of the components of FIG. 1 may take the form of a computer readable medium having a computer readable program code means embodied in a storage medium. Any suitable computer readable medium may be utilized including hard disks, CD-ROMS, optical storage devices, or magnetic storage devices. Also, it should be understood that the preferred embodiment may be implemented on many other system configurations.

A. Exchange

According to one example embodiment, host exchange 100 may include any exchange that matches orders electronically. Some example exchanges include the London International Financial Futures and Options Exchange ("LIFFE"), the Chicago Board of Trade ("CBOT"), the Chicago Mercantile Exchange ("CME"), the Exchange Electronic Trading ("Xetra," a German stock exchange), the European exchange ("Eurex"), Euronext, or Island. Exchange 100 might also refer to other known or later developed facilities that automatically match incoming orders that are received from client devices. The example exchanges and other exchanges are well known in the art.

Exchange 100 allows traders to trade tradeable objects that exchange 100 offers for trading. As used herein, the "tradeable object" refers simply to anything that can be traded with a quantity and/or price. It includes, but is not limited to, all types of tradeable objects such as financial products, which can include, for example, stocks, options, bonds, futures, currency, and warrants, as well as funds, derivatives, and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of tradeable objects, such as a class of tradeable objects.

According to the preferred embodiments, to keep participating traders informed of changes in a market, exchange 100 relays market information over a transmission channel 108 to client device 104 via gateway 102. Transmission channel 108 can include any connection types being used by exchange 100, such as a Ti line, for example, and the transmission channel can carry information in either analog or digital format. It should be understood that exchange 100 could use a number of different communication protocols for connecting and sending market information to client devices. For example, exchange 100 can connect to client device 104 via gateway 102 using TCP/IP, and can provide market information using the Financial Information Exchange ("FIX") protocol, which is a messaging standard developed specifically for real-time electronic exchange type transactions. FIX is a public-domain specification owned and maintained by FIX Protocol, Ltd.

Market information that exchange 100 sends to client device 104 via gateway 102 may include data that represents just the inside market, where the inside market is the lowest sell price (best offer) in the market, and the highest buy price (best bid) in the market at a particular point in time. Market information may also include market depth, where market depth refers to quantities available at the inside market and can also refer to quantities available at other prices away from the inside market. It should be understood that market information can also contain other types of market information such as the last traded price ("LTP"), or the last traded quantity ("LTQ"). Additionally, the market information that is sent to a single trader may include order and/or fill information related to orders associated with that trader.

Once a trader submits an order to an exchange, the exchange may process the order using different execution algorithms, and the type of the algorithm used may depend on the tradeable object being traded. Some example order execution algorithms include first-in-first-out ("FIFO") and pro-rata algorithms. The FIFO algorithm, used for some tradeable objects listed with Eurex, for example, gives priority to the first person in an order queue at an exchange to place an order. The pro rata algorithm, used for some tradeable objects listed with LIFFE, for example, splits orders for the same price, and the orders at identical prices are filled in proportion to their size. Also, it should be understood that the price order queue is a term that covers a broad range of systems used by an exchange to conduct orderly financial transactions such as, for example, a FIFO based system or a pro rata system. Also, the present invention is not limited to any particular type of order execution algorithm, and different algorithms could also be used.

B. Gateway

According to the preferred embodiment, gateway 102 can be a computer running software that receives market information and order information from host exchange 100. As used herein, a computer includes any device with memory 110 and a processor 112 capable of processing information to produce a desired result. Thus, gateway 102 can be a computer of any size such as a server, workstation, personal computer, or laptop, but, generally, gateway 102 can be any computer device that has the processing capability to perform the function described herein. Also, it should be understood that the functions of gateway 102 could be moved to host exchange 100 and/or client device 104 to reduce or eliminate the need for gateway 102.

In the preferred embodiment, gateway 102 receives market information as well as order related data from host exchange 100, and forwards the received data to client device 104. In one embodiment, while market information may be transmitted between exchange 100 and client device 104 using multicast transmission, order related information, such as order fills, order requests, or order modification requests are typically sent using unicast transmission. As known in the art, while the multicast allows for communication between a single sender and multiple receivers in the network, the unicast only allows for communication between a single sender and a single receiver. It should be understood that while there are many possible protocols that can be used to multicast and unicast information between exchange 100 and client device 104 via gateway 102, the Pragmatic General Multicast ("PGM") protocol could be used for multicasting, and the Point to Point Protocol ("PPP") could be used for unicasting, for example.

Also, as known by those skilled in the art, gateway 102 may have one or more servers to support data feeds that are received from exchange 100. In one embodiment, gateway 102 may include a price server 114 for processing price information, an order server 116 for processing order information, and a fill server 118 for processing fill information. Generally, a server is software that responds to commands from client device 104 in form of subscription. That is, a trader at client device 114 can subscribe to price information, order information, and fill information for a particular tradeable object being offered at host exchange 100. In one embodiment, the subscription may be established via a process of sending a number of messages between client device 104 and gateway 102. For example, gateway 102 may first authenticate a trader at client device 104, and then client device 104 may establish separate communication links, such as IP links, to each server at gateway 102. In the embodiment illustrated in FIG. 1, client device 104 would establish three separate IP connections to three servers at gateway 102.

Price server 114, order server 116, and fill server 118 receive information from exchange 100. According to a preferred embodiment, price server 114 may receive and process price information related to one or more tradeable objects being offered at exchange 100, while order server 116 may receive and process order related information. In one embodiment, exchange 100 may be connected to gateway 102 using two communication links, a first link between exchange 100 and price server 114, and a second link between exchange 100 and order server 116. In such an embodiment, a separate connection may exist between order server 116 and fill server 118 such that, when the order information that is received at order server 116 includes any fill related information, order server 116 may pass the fill data to fill server 118, which may then process and send the fill data to client device 104. It should be understood that the gateway configuration described above is only one example, and different implementations are possible as well.

C. Client Device

Client device 104 can be a computer, such as a workstation, desktop, laptop, handheld device, and so forth, that allow a trader to trade one or more tradeable objects that are offered at exchange 100. Client device 104 may include at least processor and memory. The processor and memory, which are both well-known computer components, are not shown in the Figure for sake of clarity. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, or any other physical medium with patterns of holes, a RAM, a PROM, an EPROM, a FLASH-EPROM, and any other memory chip or cartridge, or any other medium from which a computer can read.

Client device 104 can communicate with gateway 102 via different networks, such as Local Area Network ("LAN"), a Wide Area Network ("WAN"), or a wireless network via a Virtual Private Network ("VPN"), for example, or a combination thereof. Also, gateway 102 and client device 104 can communicate order and market related information using any messaging protocols, such as any proprietary messaging protocols. However, it should be understood that different networks and different messaging protocols could also be used.

When client device 104 receives market information and order related information from exchange 100, the received information may be displayed to the trader(s) on the visual output device or display device of client device 104. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into client device 104 such as by typing into a keyboard, inputting commands through a mouse, or inputting commands or signals through some other input device. For instance, a trader may click a mouse button to initiate an order to buy a particular quantity of the tradeable object at a particular price. Then, client device 104 preferably generates transaction information. There are many different types of messages and/or order types that can be submitted, all of which may be considered various types of transaction information. Once generated, transaction information is sent from client device 104 to host exchange 100 over communication links.

In the preferred embodiment, client device 104 uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, client device 104 could run automated types of trading applications.

The preferred embodiment may be implemented on any type of trading screen, therefore, details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X TRADER® and the MD Trader™-style display are described in U.S. Pat. No. 6,772,132, entitled "Click Based Trading With Intuitive Grid Display of Market Depth," U.S. Pat. No. 7,127,424, entitled "Click Based Trading With Intuitive Grid Display of Market Depth and Price Consolidation," U.S. Pat. No. 7,389,268, entitled "Trading Tools For Electronic Trading," and U.S. Pat. No. 7,228,289, entitled "A System and Method for Trading and Displaying Market Information in an Electronic Trading Environment," the contents of each are incorporated herein by reference. However, it should be understood that orders in the system illustrated in FIG. 1 could also be placed using any other trading application as well. Additionally, the preferred embodiments are not limited to any particular product that performs translation, storage, and display function.

Figure 2:
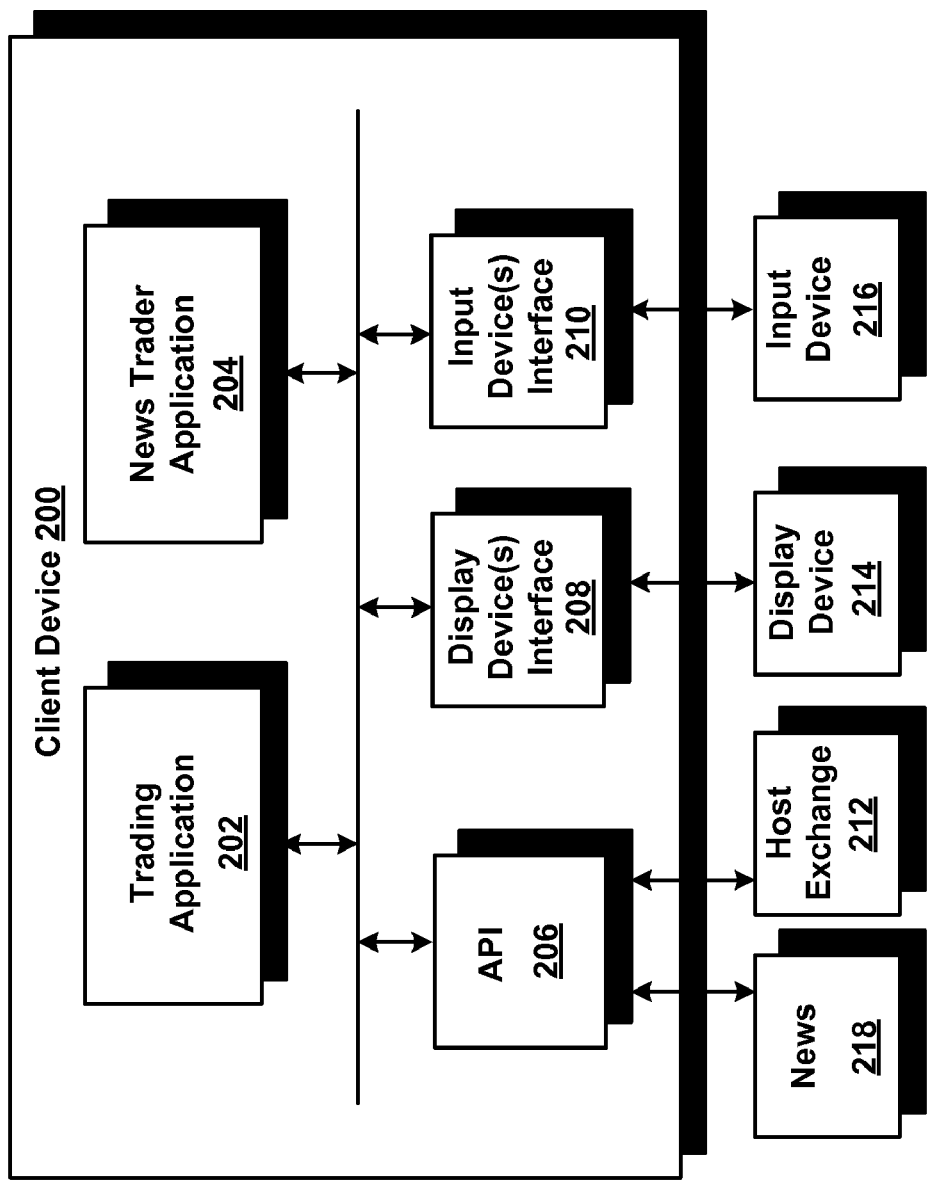
FIG. 2 is a block diagram illustrating an example client device that can be used in the example network of FIG. 1.

FIG. 2 is a block diagram illustrating an example client device 200, which may be similar to the type of client device 104 shown in FIG. 1. The client device 200 can be any particular type of computing device, examples of which were enumerated above with respect to the client device. According to the preferred embodiments, the client device 200 has a trading application 202 and news trader application 204, both of which could be stored in a memory unit. For example, the trading application 202, when executed, may arrange and display market information in many particular ways, depending on how the trader prefers to view the information.

The news trader application 204 can implement the embodiments for automatic trading based on any trader-defined news related events. It should be understood that the news related events can be based on any economic, business, or any other types of news related events that a trader may consider relevant to his/her one or more trading strategies.

Preferably, the trading application 202 and the news trader application 204 have access to market information through an application programming interface ("API") 206, and the trading application 202 could also forward transaction information to the host exchange 212 via the API 206. Additionally, the trading application 202 and the news trader application 204 could receive economic indicator data or other news related data through the API 206 from outside sources, such as the news sources 218.

Additionally, the trading application 202 and the news trader application 204 could receive signals from an input device 216 via an input device interface 210, and can be given the ability to send signals to a display device 214 via a display device interface 208.

III. Event Based Trading

Every week and every month, different departments of the U.S. government, professional organizations, and academic institutions issue a large number of economic statistics including economic performance indicators, as well as other reports. Economic performance indicators are often drawn from annual or quarterly accounts and therefore provide a useful tool in assessing national economy, such as its strength or weakness. Other indicators may be prepared based on specialized statistics such as monetary and governmental budget statistics. Regardless of the source of the economic indicators, many of them have the ability to move markets. Some indicators or indexes, such as employment indicators or a consumer feelings index on current and future spending plans, are often referred to as top tier indicators/indexes, since they are closely watched by the majority of traders. Other indicators, such as reports on wholesale sales, may not get that much attention from the majority of traders, and thus may have no impact on the markets. The embodiments described hereinafter will refer to using economic indicators as triggers for trading strategies. However, it should be understood that the preferred embodiments are not limited to any specific economic indicators or indexes, and may use other news related data such as releases from any governmental agencies, including released of governmental hearing decisions, national elections, or any other events or any combination of events/indicators that a trader may deem likely to influence the market movement or the trader's trading strategies.

The announcements of economic and other news related indicators are pretty much standardized such that, for example, traders know on what day and at what time certain indicators or reports will be announced. Also, it is well known that announcements of many indicators may often involve a number of stages, including an initial announcement of an estimated indicator value, then an announcement of an actual indicator value, and finally an announcement of a revised indicator value. It should be understood that while actual and revised indicator values may be released from actual sources responsible for releasing an indicator value, the estimated indicator values may originate from other independent sources, such as one or more economists predicting a certain indicator value. For example, if an indicator is typically announced on June 1 at 8 a.m., a high, low, and mid estimated value for the indicator may be initially announced on May 1 at 8 a.m., and then can be further modified until June 1. Then, on June 1 at 8 a.m., the actual value for the indicator will be announced. It should be understood that the actual indicator value could be later revised by announcing a revised indicator value to correct some miscalculations of the actual indicator value. In this example, the revised indicator value could be revised some time in August.

Since news announcements can move markets and can significantly affect traders' portfolios, most traders watch them very closely and develop their trading strategies accordingly. Some traders simply refuse to risk any money and attempt to delete their orders before and/or after announcements of certain news or reports that have historically proven to trigger unpredictable market movements. Other traders, however, may view some news releases as a great opportunity to implement their trading strategies, and therefore often attempt to take advantage of the sudden market movements that are caused by announcements of certain indicators. According to the example embodiments that will be described in greater detail below, a trader may automate the process of reacting to news releases by pre-defining one or more trading strategies to be automatically executed upon detecting any user-defined news releases.

Typically, a trader tracks a host of indicators and develops his trading strategies using the numbers he sees. Many trading strategies are often based on a comparison of the actual indicator values at the time of their announcement to one or more earlier estimated indicator values. Therefore, the trader's financial success in taking advantage of the market movements may depend on the trader's ability to quickly see the relative difference between the estimated indicator values compared to the actual indicator values at the time of their announcement, and on the trader's ability to quickly and accurately implement trader's trading strategies upon the release of the actual indicator values. The example embodiments that will be described hereinafter enable a trader to easily configure and modify trading strategies in relation to one or more indicator values, and quickly view a relative position of any newly released number compared to a group of estimated numbers, for example.

According to the example embodiments, a trader may define a plurality of trading strategies that can be automatically executed upon detecting one or more predefined indicator-related triggers. In one embodiment, the trader may do that using one or more graphical user interfaces ("GUI"). For example, before one or more actual values associated with the selected indicators are announced, a trader could configure a set of trading rules based on one or more estimated indicator values. In such an embodiment, when one or more actual numbers corresponding to the selected indicators are announced and received at the news trader application 204, the news trader application 204 could automatically execute one or more trading strategies selected based on the comparison of the actual indicator values to the respective estimated indicator values.

Figure 3:
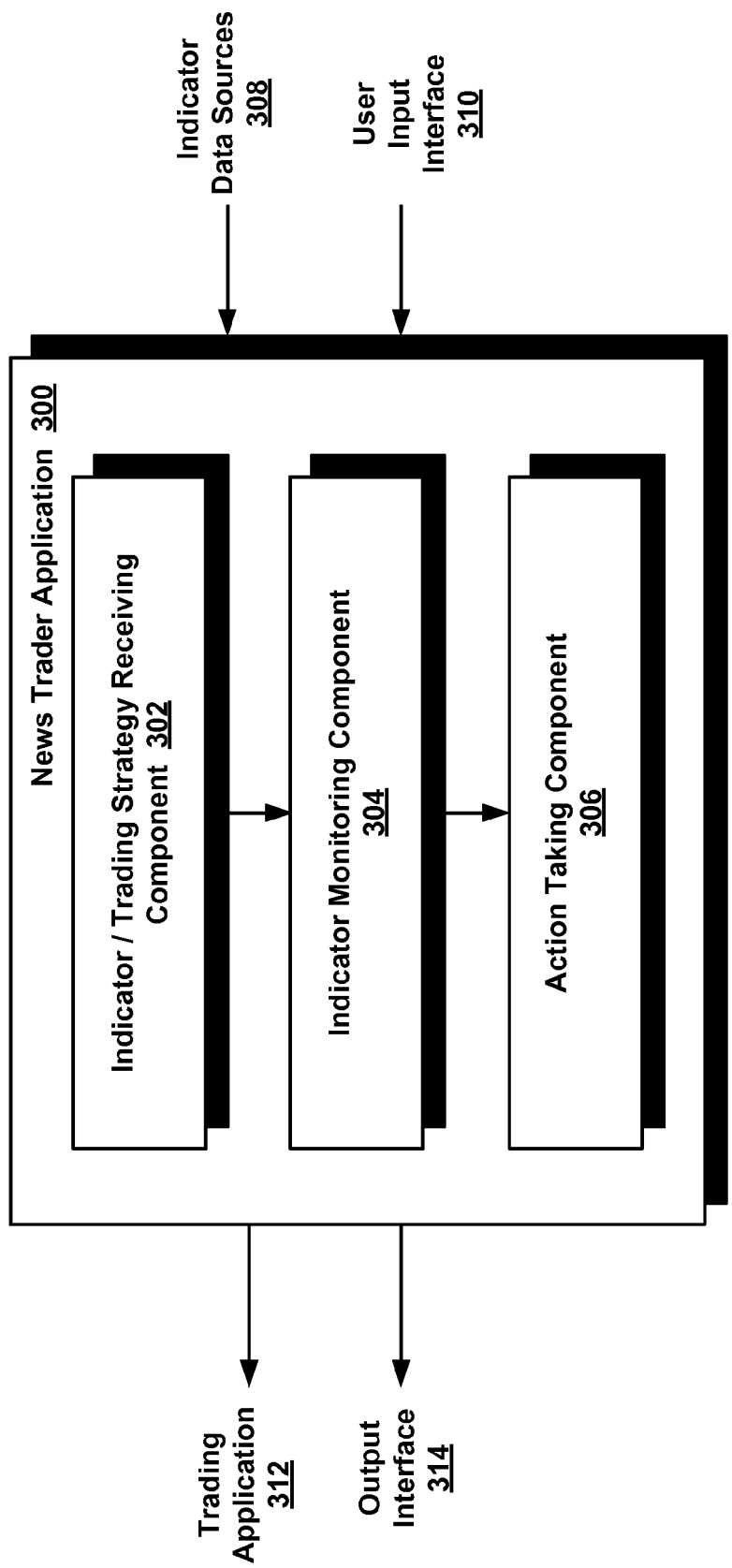
FIG. 3 is a block diagram illustrating an example news trader application according to one example embodiment.

FIG. 3 is a block diagram illustrating a news trader application 300 for carrying out the present embodiments. The news trader application 300 includes an indicator/trading strategy receiving component 302, an indicator processing component 304, and an action taking component 306. The components 302, 304, and 306 may include software and/or hardware elements to perform their functions. However, it should be understood that the news trader application 300 may include more or fewer components than those shown in FIG. 3. Also, the illustrated components could be combined with other components. For example, the news trader application 300 could be combined with the trading application components of a particular client device.

The receiving component 302 may receive trading strategy requests from traders via a user input interface 310. According to one example embodiment, a trader may input a number of trading rules to be used for a specific trading strategy. A trading rule may include one or more conditions and one or more actions to be taken when the conditions are satisfied or not satisfied (depending on user configuration). According to one example embodiment, a trading rule condition may take a format of any user-configurable expression or equation including one or more variables relating to economic indicators or other news related data. For example, the trading rule condition may be based on a difference between an estimated indicator value and an actual indicator value at the time when the actual indicator value is announced.

In addition to defining at least one condition for a trading rule, a trader can also define one or more actions to be taken once the condition is satisfied. According to an example embodiment, a trader may define many different market related actions to be taken once one or more conditions associated with a trading rule are satisfied. For example, an action may include any market related request, such as a request to send one or more buy or sell orders for predefined tradeable objects to one or more user-specified exchanges, adjusting order parameters, deleting one or more orders, or a combination thereof. It should be understood that when a trader defines a request to submit an order to an exchange, a trader may define a tradeable object for which the order should be placed, one or more exchanges to which the order should be sent, an order quantity, an order price, an order type, a time when the order should be sent or cancelled, or any other order related parameters.

Also, it should be understood that some economic indicators can include a number of indicator components. In such an embodiment, a graphical interface could be provided to enable a trader to select which indicator components the trader wishes to use as conditions for his trading strategy, and which indicator components the trader wishes to eliminate. Also, a trader could assign different weights to the indicator components such that some components would be given a higher weight than others. Alternatively, different weights could be assigned to different actual indicator values. In such an embodiment, for example, upon receiving data related to one or more components associated with trading rules, the news trading application could initially determine a weight assigned to each component based on the received indicator values, and then may sum the weights to determine a composite weight value. Then, the news trading application could select a trading strategy based on the composite weight value. It should be understood that the same method for determining a trading strategy based on adding weight values is not limited to indicator components, and the same method could also be applied to the main indicators corresponding to a trading strategy.

In addition to receiving trading strategies, the receiving component 302 could also receive economic indicator and other news related data. In one embodiment, such data may be received directly from outside sources 308. Alternatively, a trader could monitor a set of indicators and input indicator values via the user input interface 310, the embodiments of which will be described in greater detail below.

When a trader sets up a number of trading rules to be applied in response to detecting one or more indicator types and indicator values, the indicator processing component 304 may start monitoring data associated with the indicators specified in relation to the defined trading rules. Then, when the indicator processing component 304 detects that the conditions associated with a specific trading strategy are satisfied, the action taking component 306 may take certain actions specified for the detected conditions. For example, the action taking component 306 may send a request to the trading application 312 to automatically submit one or more orders on the trader's behalf. Also, when the news trader application 300 receives any actual values, or revised values associated with one or more indicators, the action taking component 306 may display the received data via an output interface 314.

Figure 4:
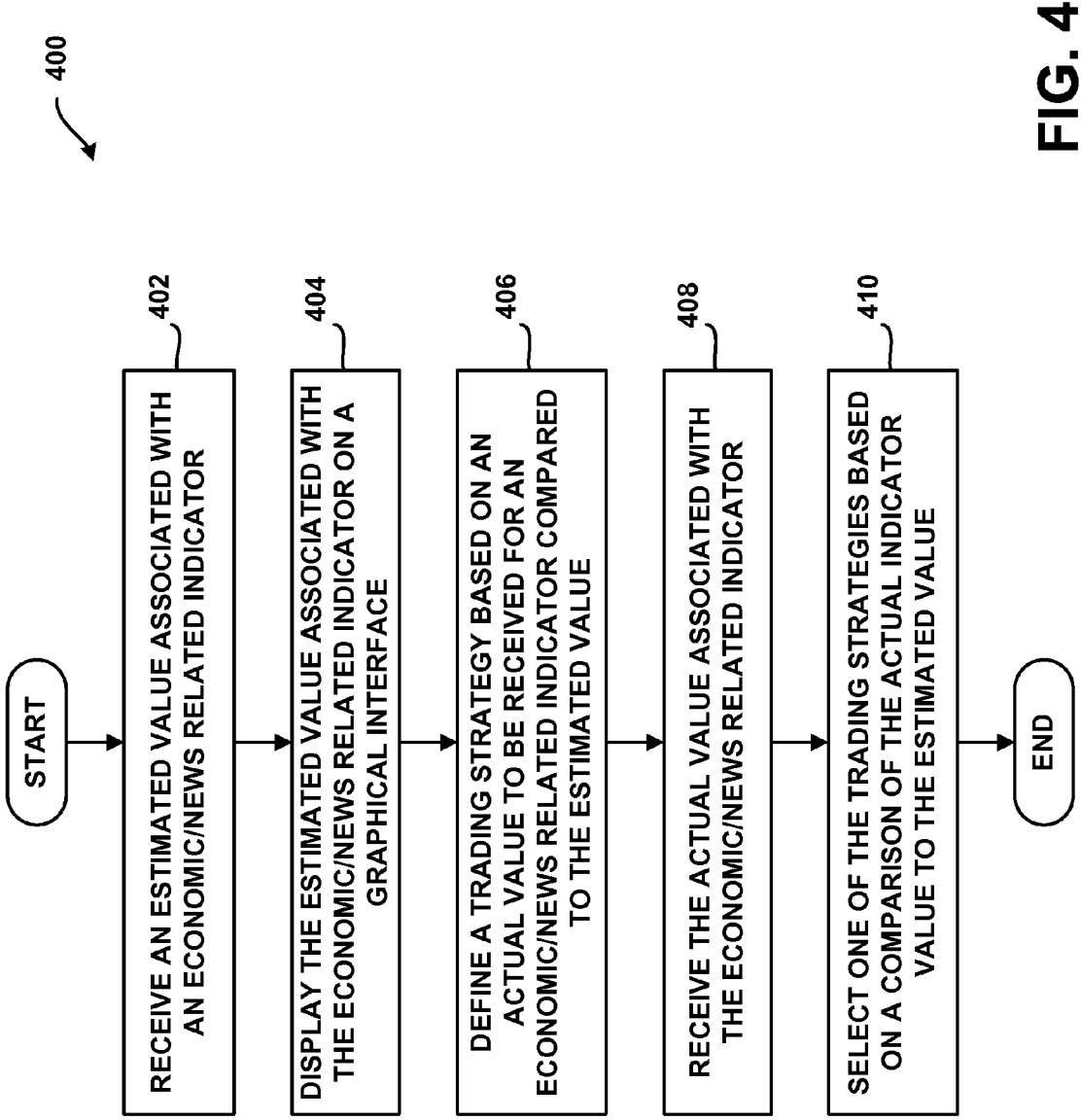
FIG. 4 is a flow chart illustrating a method for processing economic indicators according to one example embodiment.

FIG. 4 is a flow chart illustrating an example method 400 for automatic trading based on events, such as economic or news related indicator values according to one example embodiment. The method 400 will be described in relation to the components illustrated in FIG. 3; however, it should be understood that different components could also be used to execute the method. Also, it should be understood that the flow chart only shows the functionality and operation of a possible implementation of the present embodiments. In this regard, each block may represent a module, a segment, or a portion of the code, which includes one or more executable instructions for implementing specific logical functions or steps in the process. Alternative implementations are included within the scope of the preferred embodiments of the present invention in which functions may be executed out of order from that shown or discussed, including substantially concurrent or in reverse order, depending on the functionality involved, as would be understood by those reasonably skilled in the art of the present invention. The method 400 is described in relation to economic indicators. However, as mentioned earlier, the method 400 can be applied in relation to any event values, including any news related events such as economic indicators.

At step 402, the receive component 302 receives an estimated value associated with an economic indicator. In one embodiment, a trader may input the estimated value associated with the indicator using the user input interface 310. Alternatively, the estimated value may be received from any outside source selected by the trader. It should be understood that the method 400 is not limited to using a single indicator, and more than one indicator could also be used.

At step 404, the action taking component 306 may initiate the process of displaying the estimated value associated with the economic indicator on a graphical interface at a client device. Then, at step 406, the trader may define at least one trading strategy based on one or more indicators. As mentioned earlier, the trader may define a number of trading rules to be automatically executed upon detecting an announcement of an actual value for each indicator specified in relation to the trading strategy. Each trading rule, as described above, may be associated with at least one condition, and the condition may be based on a comparison of an actual value to be received for a specific indicator compared to the estimated value specified for that indicator. However, it should be understood that similar rules could be defined based on a comparison of a revised indicator value and an actual indicator value. Also, as mentioned earlier, trading rules could be defined based on trader's predictions or some other news releases.

At step 408, the indicator receive component 302 receives the actual value associated with the economic indicator. At step 410, the indicator processing component 304 selects one of the trading strategies based on a comparison of the actual indicator value to the estimated indicator value. It should be understood that when a trading strategy includes a plurality of conditions associated with different indicators or news related data, the action taking component 306 may trigger the execution of the trading strategy once all conditions are satisfied.

Figure 5:
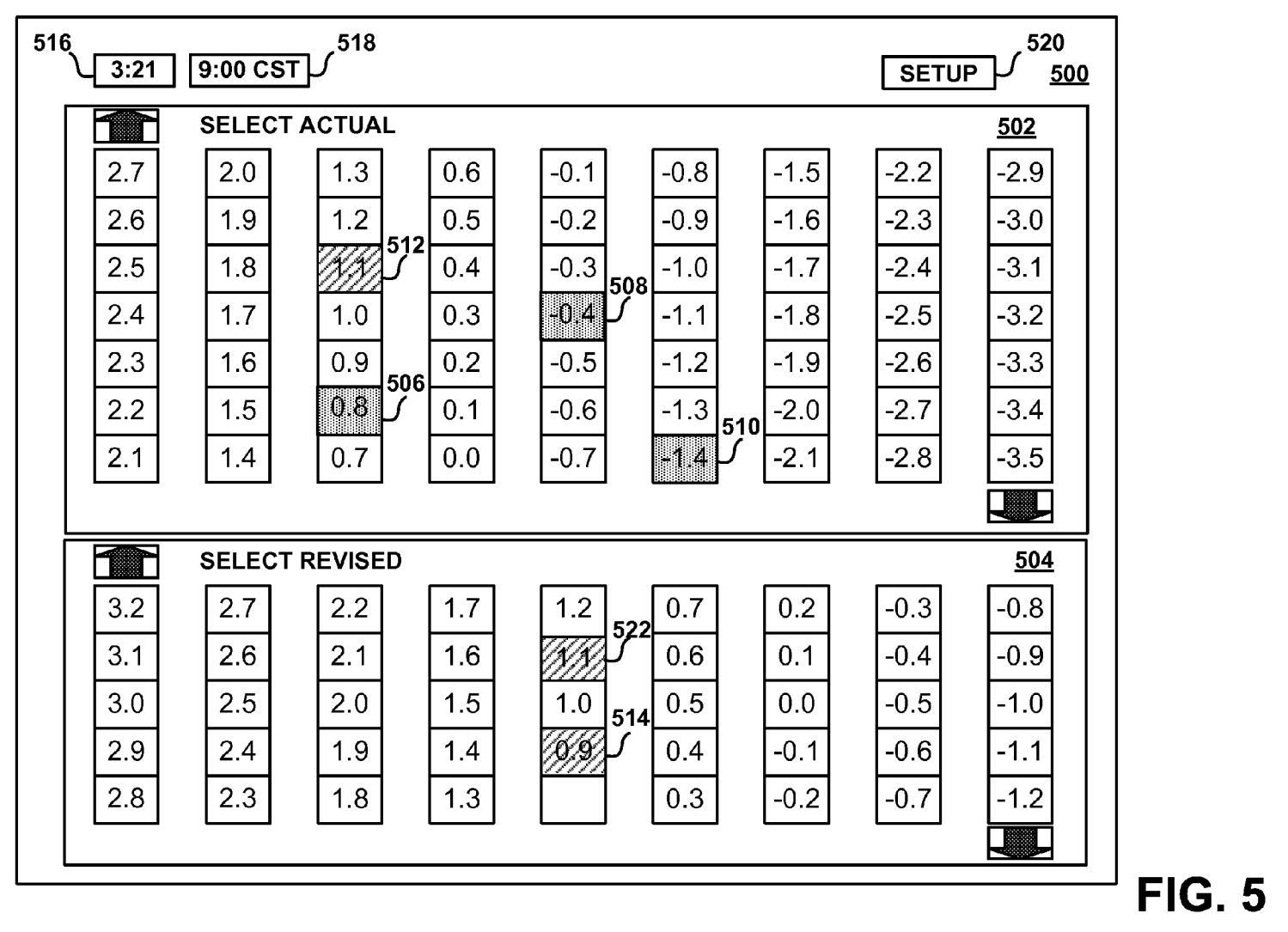

FIG. 5 is a block diagram illustrating one example news trader interface 500 that a trader may use to input actual event values.

The news trader interface 500 includes two window interfaces 502 and 504 that display in a wrapping vertical bar one or more values for a selected indicator, such as an unemployment number, for example. It should be understood that the graphical interface in FIG. 5 illustrates only one example embodiment, and different displays or layouts could also be used. For example, the interfaces could display one or more horizontal bars with values wrapping around in any user-defined direction. According to the embodiment illustrated in FIG. 5, a trader may define three estimated event values, referred hereinafter as estimated indicator values, such as estimated high, low, and average values for an indicator via a set up window (not shown), which may be activated by selecting a setup icon 520. Additionally, the trader could use the set up window to enter a time and day for the occurrence of the actual indicator (such as 11 CST, every first Friday of the month). When the trader closes the set up window, the window interface 502 can display the estimated values for the indicator. More specifically, as shown in FIG. 5, the display window 502 displays three estimated indicator values, including an average indicator value of −0.4 at 508, a high estimated indicator value of 0.8 at 506, and a low estimated indicator value of −1.4 at 510. The interface 500 also displays a time, such as 9:00 CST at 518, when the actual number will be announced. In addition to displaying the time when the number is to be announced, the window interface 500 could also display a clock 516 specifying the time left until the number announcement. Alternatively, the clock 516 could define time since the number has been announced. In such an embodiment, the window displaying the time may be color coded to distinguish between the time left until the indicator release, and the time passed since the indicator release. For example, red could be used to define time left until the indicator release, and blue could be used to define time passed since the indicator release.

In one embodiment, when the actual number associated with the indicator is announced, the trader may input the value associated with the announced indicator via the window interface 502 by simply selecting the value corresponding to the number. When the trader selects the actual indicator value, it may be displayed via the window interface 502. It should be understood that the values associated with different categories of indicators, such as estimated and actual indicator values, could be color-coded such that a trader can easily distinguish between the two categories. For example, once the actual value associated with the indicator is input by a trader, the window interface 502 may display the actual value, such as 1.1 at 512, in relation to the estimated indicator values.

Also, a number of news trading applications being used by a plurality of traders can be networked together to allow communication of indicator data between the traders. In such an embodiment, when one of the networked traders inputs an actual value corresponding to an indicator being monitored or used by one or more other traders in the group, the news trader application corresponding to the trader who input the data may automatically send the received actual indicator value to all other traders in the group using that indicator as part of their trading strategy, for example. It should be understood that the ability to input and automatically distribute indicator data may be limited to system administrators, for example.

Using the window interface 504, a trader could also enter a revised value for the last month's actual indicator value. In such an embodiment, while the window interface 502 can display estimated and actual values for an unemployment number for the month of October, for example, the revised value entered via the window interface 504 will correspond to the revised value of the actual unemployment number for the month of September, such as 0.9 shown at 514. The window interface 504 could also display the last month's actual indicator value such as 1.0 at 522. It should be understood that when the trader enters the actual value for an indicator associated with a predefined trading strategy, the user input may dynamically trigger the execution of the trading strategy that is based on that actual indicator value. Also, it should be understood that while the embodiments described in relation to the graphical interface 500 refer to a trader entering estimated, actual, and revised indicator values, alternatively, these numbers may be directly received in one or more predefined formats from outside sources selected by the trader. In such an embodiment, when the news trading application receives indicator data from outside sources, the news trading application may automatically display the received indicators via the window interfaces, and may dynamically execute any trading strategies that are triggered based on the received indicator values.

Figure 6:
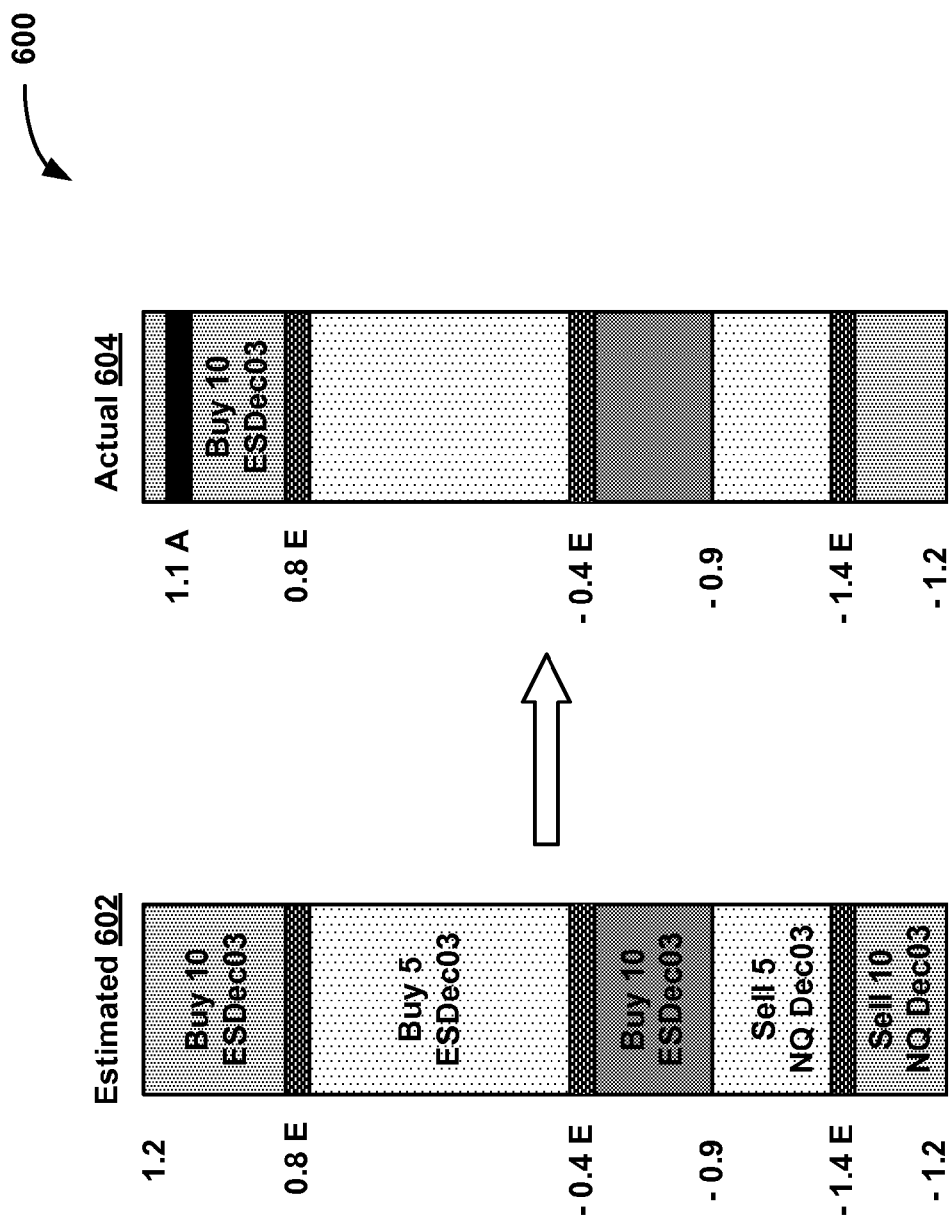
FIGS. 6A and 6B are block diagrams illustrating two graphical interfaces that may be used for displaying estimated, actual, and/or revised indicator values, and for viewing trading strategies in relation to the configured values according to one example embodiment.

FIGS. 6A and 6B are block diagrams 600 illustrating two graphical interfaces that may be used for displaying estimated, actual, and/or revised indicator values, and for viewing trading strategies in relation to the configured numbers. FIGS. 6A and 6B refer to indicator values, however, the interfaces could also be used in relation to any event values.

More specifically, FIG. 6A is a block diagram illustrating a graphical interface 602 for displaying estimated indicator values and trading strategies in relation to an axis of values. The graphical interface 602 illustrates three icons associated with estimated indicator values including a low estimated indicator value of −1.4, an average estimated indicator value of −0.4, and a high estimated indicator value of 0.8. In one embodiment, the interface 602 could initially display one or more icons that a trader could simply position at locations corresponding to desired estimated indicator values. In such an embodiment, a trader could easily and quickly modify estimated indicator values by simply dragging the icons to desired locations on the interface 602. In addition to displaying the estimated indicator values, the interface 602 displays a number of trading rules icons corresponding to trading rules to be automatically executed upon detecting an actual indicator value being in one of the predefined ranges. It should be understood that trading rule icons could also be moved in relation to the axis such that a range of estimated indicator values corresponding to the rule is modified based on repositioning of the indicators. For example, as shown in FIG. 6A, if an actual indicator value is between endpoints 0.8 and 1.2, the action taking component 306 of the news trading application 300 may automatically submit an order to Buy 10 contracts corresponding to the tradeable object ESDec 03. Similarly, for example, if an actual indicator value is between endpoints −0.9 and −1.4, the action taking component 306 may automatically submit an order to Sell 5 contracts corresponding to the tradeable object NQ Dec03. It should be understood that a trader can specify whether a trading strategy includes endpoints.

Also, the trading rules illustrated in FIG. 6A are only example rules, and more complicated trading strategies could be defined as well. In one embodiment, the trading strategies may be input by a trader using a graphical interface that the trader could activate by simply clicking on any location within the interface 602. Also, it should be understood that a trader could define a specific time when the action taking component 306 should execute the trading rules. In one embodiment, the news trader application 300 could execute a trading rule when all conditions triggering the trading rule are-satisfied. Alternatively, a trader could define a specific time after a trading rule is triggered when the news trader application should execute the trading rule. Those skilled in the art will understand that many different rule configurations are possible as well.

FIG. 6B is a block diagram 604 illustrating the graphical interface of FIG. 6A once the actual indicator value is received at the receive component 302 of the news trader application 300. More specifically, the interface 604 illustrates an actual indicator value of 1.1 in relation to the estimated indicator values of 0.8, −−0.4, and −1.4. The interface 604 also indicates a trading rule that was applied or will be applied in relation to one or more tradeable objects based on the actual indicator value compared to one or more estimated indicator values. In an alternative embodiment, the interfaces 602 and 604 could be color-coded to enable a trader to quickly assess a possible impact of the received number on the market. For example, if an actual unemployment value falls close to the high estimated value, a portion or the entire interface could change color to represent either a possible positive or negative impact on the market.

FIGS. 6A and 6B illustrate only one example graphical representation for displaying indicator values as well as trading rules. It should be understood that the interfaces could take any user-configurable formats and could be positioned horizontally, vertically (as shown), or at any other user-defined angles. Also, a trader could configure indicator types and indicator colors to be used to represent different indicator types, and a single interface could be used to display indicator values as well as trading strategies corresponding to different indicators. Additionally, while the interface 602 displays trading strategies corresponding to single tradeable objects, in an alternative embodiment, the interfaces could display a sum of all buys and sells corresponding to more than one tradeable object that is associated with a specific trading strategy. In such an embodiment, a trader could view which tradeable objects that are associated with the sum by simply clicking on the displayed numbers, for example.

Figure 7:
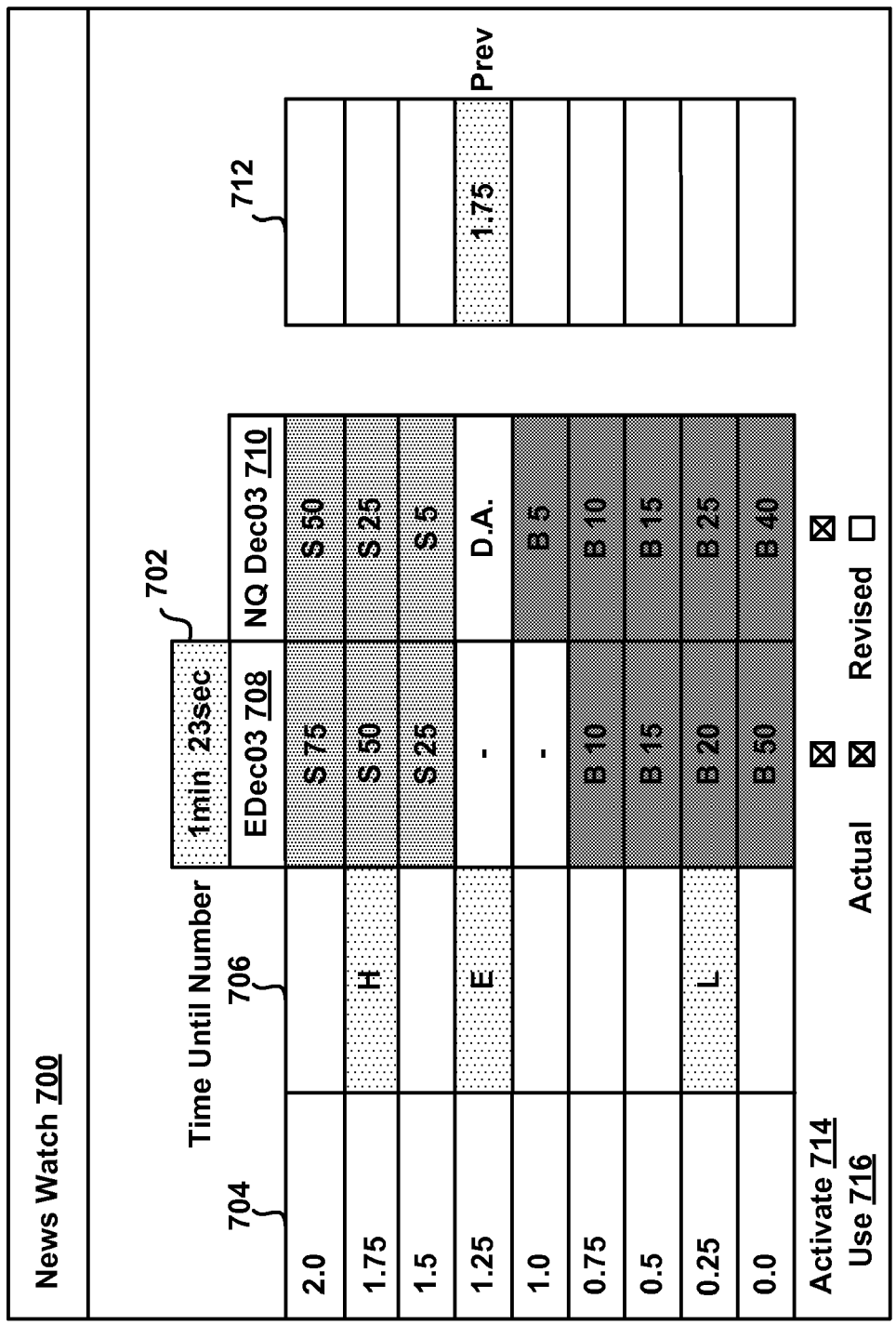
FIG. 7 is a block diagram illustrating another graphical interface that may be used for displaying a plurality of trading strategies in relation to estimated indicator values before receiving an actual indicator value according to one example embodiment.

FIG. 7 is a block diagram illustrating another embodiment of a graphical user interface 700 that may be used by a trader to input and view trading rules in relation to estimated indicator values for a selected indicator according to one example embodiment. The interface 700 displays a countdown clock 702 corresponding to a time interval, such as 1 minute and 23 seconds, in this embodiment, before the next release of the actual indicator value. The interface 700 also displays at 704 a number of values, some of which may correspond to the estimated indicator values that are used to define conditions triggering different trading rules. More specifically, as illustrated at 706, three values are selected to represent an estimated indicator range including a high ("H") estimated indicator value of 1.75, an average estimated ("E") indicator value of 1.25, and low ("L") estimated indicator value of 0.25. It should be understood that the values displayed at 704 may be input by a trader or may be received from any other sources. In addition to the estimated indicator value, the interface 700 also displays at 712, the previous indicator values, such as the actual indicator value corresponding to the previous indicator release.

The interface 700 also displays a number of trading rules for the tradeable objects ESDec03 at 708 and NQDec03 at 710. The activation of the trading rules, as shown in FIG. 7, may depend on detecting one or more conditions associated with estimated indicator values specified for the trading rules. For example, upon detecting that an actual indicator value is at 1.75, the news trader application can submit an order to sell 50 lots for the tradeable object ESDec03, and an order to sell 25 lots for the tradeable object NQ Dec03. Similarly, if the actual indicator value turns out to be 1.25, no action will be taken in relation to the ESDec03 tradeable object, and the news trader application can delete all orders ("D.A"), as shown in FIG. 7, associated with the tradeable object NQ Dec03. It should be understood that a trader could set up trading rules using another interface that the trader could activate by simply selecting a cell corresponding to one or more estimated indicator values. Alternatively, another interface could be provided to allow a trader to select and drag into the interface 700 tradeable objects in relation to which the trader could define a number of trading strategies. Also, it should be understood that while each cell corresponding to a specific indicator value level displays only a total quantity and an action to be taken at that level, a trader could simply select the cell to view or modify any parameters related to the trading rule.

In one embodiment, a trader could preconfigure a large number of trading strategies for many tradeable objects. However, rather than applying all preset strategies whenever conditions for the strategies are satisfied, a trader could activate or deactivate which strategies should be used by simply selecting activation boxes 714 displayed in relation to each tradeable object. Also, it should be understood that rather than using actual indicator values, a trader could also select revised indicator values as conditions for the trading strategies. To do that, the trader could simply select one of the boxes 716 corresponding to the actual or revised indicator values.

Figure 8:
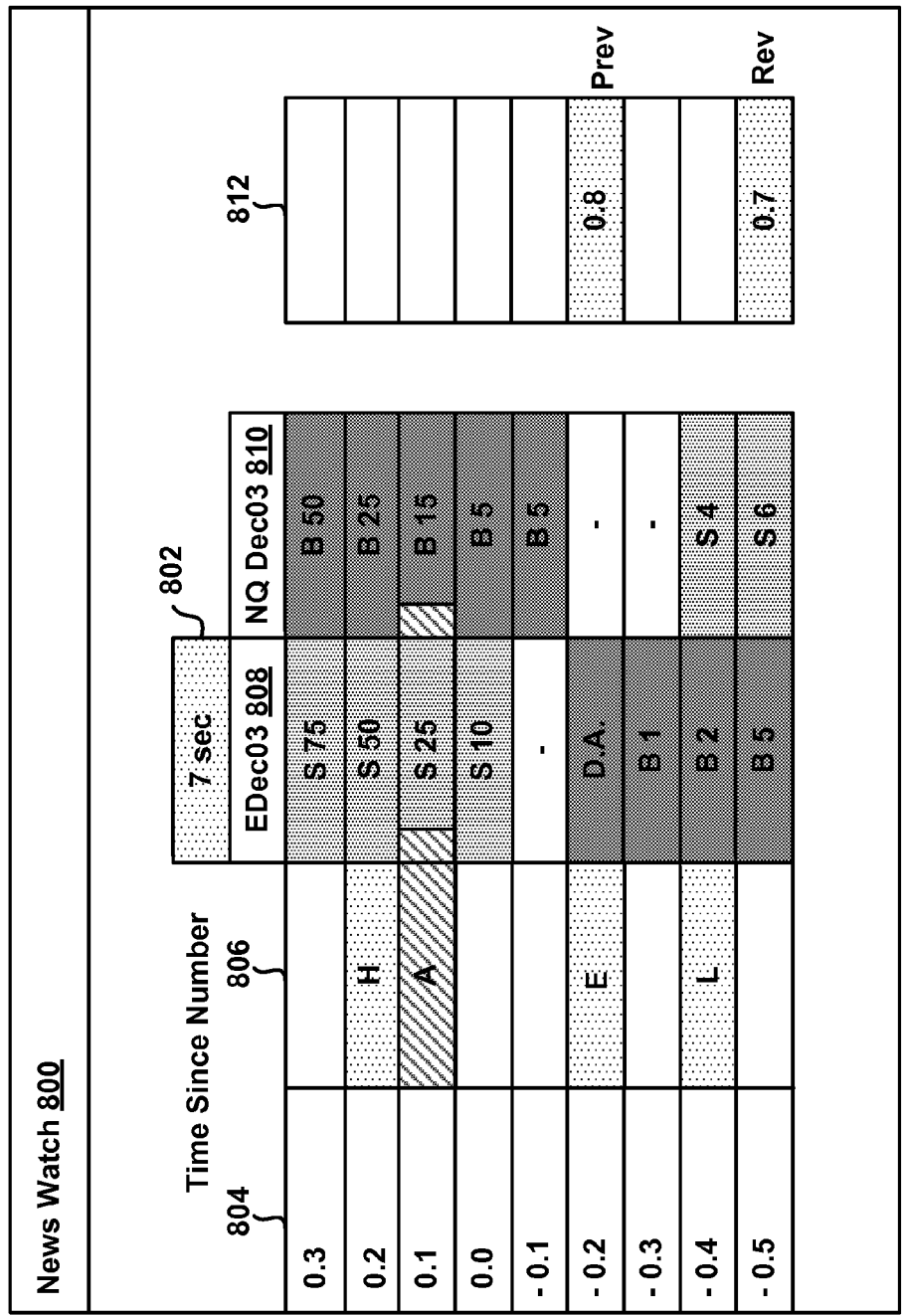
FIG. 8 is a block diagram illustrating a graphical interface that may be used for displaying a plurality of trading strategies in relation to estimated indicator values after the announcement of an actual indicator value according to one example embodiment.

FIG. 8 is a block diagram illustrating one embodiment of a graphical interface 800 that may be displayed to a trader after the actual indicator value is received at the news trader application.

A countdown clock 802 now indicates the time of 7 seconds since the release of the actual indicator value. Also, the interface 800 displays the actual ("A") indicator value of 0.1 in relation to the average, high, and low estimated indicator values at 806. In one embodiment, once the actual indicator value is detected, the interface 800 can highlight a trading strategy selected based on the actual indicator value. In the embodiment illustrated in FIG. 8, the trading rules to sell 25 lots of the tradeable object EDec03, as shown at 808, and to buy 15 lots of the tradeable object NQ Dec03, as shown at 810, correspond to the actual indicator value of 0.1. It should be understood that the interface 800 could also use different colors or different indicators to distinguish between different stages of execution of the trading strategy. For example, one color or an indicator could be selected to represent an action of sending one or more orders to an exchange, and different colors or indicators could be used to represent different stages of executing the trading strategy, such as detecting fills for the submitted orders. Also, the interface 800 may illustrate previous and revised indicator values corresponding to the last announcement periods, such as the last week, month, or quarter, for example.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for event driven virtual workspace in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A system for event-based trading, the system comprising:
   a computing device configured to receive a news data feed originating from a source other than an electronic exchange, wherein the news data feed provides an actual event value for a news event that affects a market related to a tradeable object,
   wherein the computing device is further configured to receive an estimated event value for the news event prior to an announcement of the actual event value,
   wherein the computing device is further configured to define a first trading strategy comprising a first plurality of trading rules to be executed based on a comparison of the estimated event value to the actual event value,
   wherein the computing device is further configured to receive the actual event value subsequent to receiving the estimated event value and defining the first trading strategy,
   wherein the computing device is further configured to select a trading rule of the first plurality of trading rules corresponding to the first trading strategy based on a comparison of the actual event value to the estimated event value, and
   wherein the computing device is further configured to execute the selected trading rule, wherein to execute the selected trading rule, the computing device is further configured to generate a transaction message to be sent to the electronic exchange.

2. The system of claim 1, wherein the estimated event value comprises an estimated news-related event indicator value, and wherein the actual event comprises an actual news-related indicator value.

3. The system of claim 1, wherein the actual event value and the estimated event value are received directly from a news source through the news data feed.

4. The system of claim 3, wherein computing device is further configured to display the estimated event value in a first graphical format on a graphical user interface.

5. The system of claim 4, wherein the computing device is further configured to display the actual event value in a second graphical format on the graphical user interface in response to receiving the actual event value.

6. The system of claim 5, wherein the estimated event value and the actual event value are displayed using different indicators.

7. The system of claim 5, wherein the computing device is further configured to display a time left before the actual event value is released.

8. The system of claim 5, wherein the computing device is further configured to display a time since a release in response to receiving the actual event value.

9. The system of claim 1, wherein the actual event value and the estimated event value are input by a user via a graphical user interface.

10. The system of claim 1, wherein the computing device is further configured to display the first plurality of trading rules in relation to the estimated and actual event values displayed via a graphical user interface.

11. The system of claim 1, wherein the computing device is further configured to define a second trading strategy comprising a second plurality of trading rules to be applied based on a comparison of the actual event value to a revised event value to be announced at a later time, wherein the computing device is further configured to receive the revised event value, wherein the computing device is further configured select a trading rule of the second plurality of trading rules based on a comparison of the revised event value to the actual event value, and wherein the computing device is further configured to execute the selected trading rule of the second plurality of trading rules corresponding to the second trading strategy.

12. The system of claim 10, wherein the computing device is further configured to display the revised event value and the actual event value on a graphical user interface.

13. The system of claim 11, wherein the revised event value comprises a revised news-related indicator value.

14. The system of claim 1, wherein the transaction message comprises an order transaction message.

15. The system of claim 14, wherein the order transaction message comprises an order message to buy or sell the tradeable object.

16. The system of claim 14, wherein the order transaction message comprises an order cancel request message.

17. The system of claim 14, wherein the order transaction message comprises an order change request message.

* * * * *